United States Patent

Ross et al.

Patent Number: 5,598,989
Date of Patent: Feb. 4, 1997

[54] SPACECRAFT PROTECTIVE BLANKET

[75] Inventors: Barry S. Ross, Manhattan Beach; Robert L. Reynolds, Los Angeles; Glen A. Vanbebber, Torrance; Daniel A. White, Manhattan Beach, all of Calif.

[73] Assignee: Hughes Aircraft Company, Los Angeles, Calif.

[21] Appl. No.: 784,338

[22] Filed: Oct. 29, 1991

[51] Int. Cl.⁶ .................................................. B64G 1/00
[52] U.S. Cl. .......................... 244/158 A; 244/117 A; 427/386
[58] Field of Search ................... 244/158 A, 117 A, 244/1 A, 158 R, 163; 250/492.1, 492.2, 492.3; 427/386, 380; 136/292; 428/922

[56] References Cited

U.S. PATENT DOCUMENTS

| 4,451,828 | 5/1984 | Fuldner | 244/173 X |
| 4,489,906 | 12/1984 | Fellas | 244/1 A X |
| 4,755,231 | 7/1988 | Kurland et al. | 136/292 X |
| 4,910,050 | 3/1990 | Oldham et al. | 244/158 A X |
| 4,925,134 | 5/1990 | Keller et al. | 244/158 A |
| 4,996,109 | 2/1991 | Krieg et al. | 428/304.4 |

FOREIGN PATENT DOCUMENTS 0356714  7/1989  European Pat. Off.
2469388  11/1980  France.

OTHER PUBLICATIONS

Ronald T. Reeve, Jet Propulsion Laboratory, California Institute of Technology, "Thermal Redesign of the Galileo Spacecraft for a VEEGA Trajectory," Journal of Spacecraft and Rockets (Mar./Apr., 1991).

James W. Stultz, Jet Propulsion Laboratory, California Institute of Technology, "Thermal Design of the Galileo Spun and Despun Science," Journal of Spacecraft and Rockets (Mar./Apr., 1991).

H. Tsunoda, K. Nakajima and A. Miyasaka, NTT Radio Communication Systems Laboratories, "Thermal Design Verification of a Large Deployable Antenna for a Communications Satellite," Journal of Spacecraft and Rockets (Mar./Apr., 1992).

Primary Examiner—Christopher P. Ellis
Attorney, Agent, or Firm—G. R. Lindeen, III; W. K. Denson-Low

[57] ABSTRACT

A spacecraft multilayer insulation blanket is made from multiple sheets of polyimide e.g. KAPTON. A preferred six sheet embodiment employs three carbon loaded sheets (26, 32, 34) separated by two dielectric sheets (28, 30). A third dielectric sheet (36) insulates the carbon loaded sheets from the spacecraft body. The outermost carbon loaded sheet (32) has a high resistivity and is primarily transmissive while the other two carbon loaded sheets (26, 34) have a low resistivity and are primarily reflective.

19 Claims, 2 Drawing Sheets

SPACECRAFT PROTECTIVE BLANKET

FIELD OF THE INVENTION

The present invention pertains to the field of blankets for protecting spacecraft componentry from a space environment.

BACKGROUND OF THE INVENTION

Communications satellites and other spacecraft typically employ a protective blanket to shield electrical and other componentry from the space environment through which the spacecraft travels. This environment includes high and low temperature extremes, solar radiation, electron bombardment and radio frequency interference from a great variety of sources. A conventional protective blanket shown, for example, in U.S. Pat. No. 4,489,906 to Fellas is constructed from a polyimide sheet upon which aluminum has been vapor deposited to reflect radiation. The sheet is fastened to the spacecraft using rivets and adhesives. The conventional blanket typically generates passive intermodulation because of small cracks and short circuits through the vapor deposited aluminum coating and because of contact of the aluminum coating with itself, the connecting rivets and other parts of the spacecraft.

SUMMARY OF THE INVENTION

The present invention provides a lightweight, durable protective blanket that not only offers equal or better shielding from the external environment compared to conventional blankets in many cases but also generates far less passive intermodulation. In one embodiment, the invention encompasses a protective blanket comprising a carbon loaded flexible polyimide sheet. It is preferred that several sheets be combined to form a six layer blanket with alternating layers of dielectric polyimide sheets and carbon loaded polyimide sheets, the sheet contacting the spacecraft being dielectric and the sheet exposed to the space environment being carbon loaded.

BRIEF DESCRIPTION OF THE DRAWING

These and other aspects of the invention will be more clearly understood with reference to the following drawings wherein like numerals are used to refer to like features throughout and, in which.

DETAILED DESCRIPTION OF THE INVENTION

The present invention is preferably used as a spacecraft multilayer insulation (MLI) blanket with three types of polyimide film. The three types of film create an effective passive intermodulation (PIM) shield and suppressor. The blanket also protects against thermal effects, electrostatic discharge, contamination and other space environment hazards.

Figure 1:
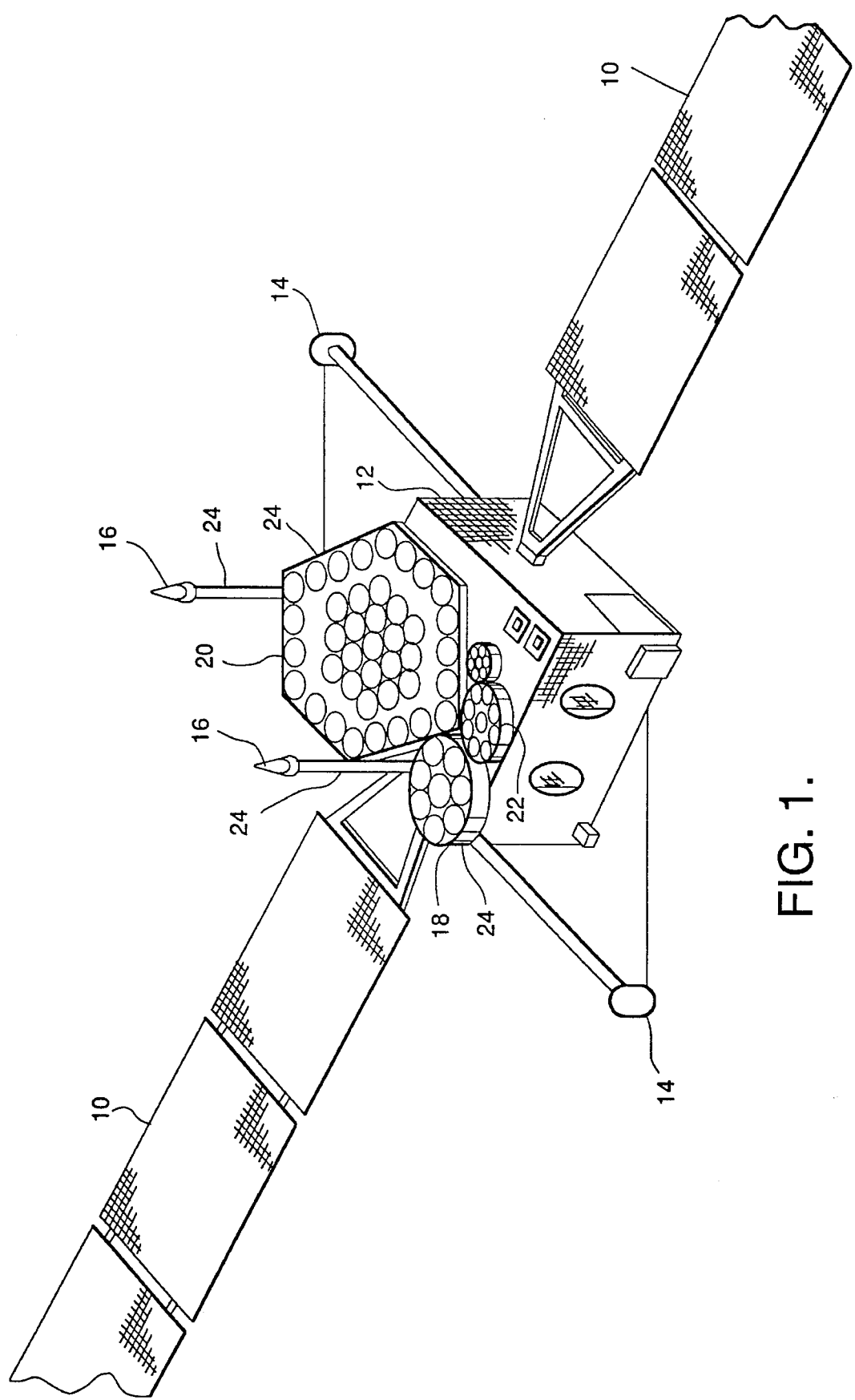
FIG. 1 shows a communications satellite incorporating the present invention.

A typical communications satellite spacecraft suitable for use with the present invention is shown in FIG. 1. The spacecraft has a pair of solar panels (10) on either side of a central body (12). The body has a pair of stabilizing booms (14) and a variety of antennas. As shown in FIG. 1 these include telemetry tracking and control antennas (16), an L-Band receive antenna (18), an L-Band transmit antenna (20) a C-Band receive antenna (21) and a C-Band transmit antenna (22). As is conventional in the art, all of the antennas are covered with a MLI blanket (24) to protect these components from the space environment. The radiating and absorbing portions of the antennas are not covered with a MLI blanket, but may be covered with some other material. The satellite of FIG. 1 is shown for general background. The present invention may be used with a great variety of different spacecraft.

Figure 2:
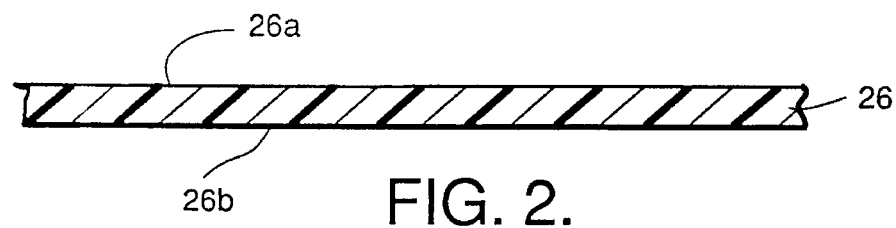
FIG. 2 shows a blanket constructed according to the present invention.

A blanket (24) according to the present invention is preferably constructed of at least one carbon loaded polyimide sheet (26) as shown in FIG. 2. The sheet has an external side (26a) for facing toward the space environment and an internal side (26b) for facing toward the spacecraft. The two sides are structurally the same because the sheet preferably has a uniform consistency through its thickness. A thickness of approximately 0.002 to 0.0025 inches (0.050 to 0.064 mm) is presently preferred. Such a sheet is available from the DuPont Corporation under the trademark "KAPTON", typically referred to as Black KAPTON and available in a variety of resistivities and thicknesses. Resistivities within the range of approximately 100 to 10,000 ohms per square are believed to be the most useful. The resistivity of free space is on the order of 377 ohms so that a sheet with a resistivity greater than 377 ohms per square will be primarily transmissive or adsorptive whereas a sheet of less than 377 ohms per square will be primarily reflective. Accordingly, for a single sheet blanket, it is presently preferred that the carbon loaded sheet have a resistivity in the range of 100 to 350 ohms per square preferably about 200 ohms per square. The sheet avoids the passive intermodulation problems of the prior art in part because the carbon loading is substantially consistent through the sheet material. The sheet has no surface coating which could be subject to cracking or chipping.

Figure 3:
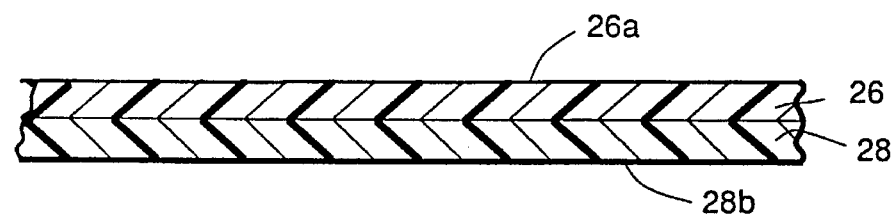
FIG. 3 shows an alternate blanket constructed according to the present invention.

FIG. 3 shows an enhanced blanket which uses two coextensive sheets. A first sheet (26) of carbon loaded polyimide like that of FIG. 2 having a resistivity of approximately 200 ohms per square and a second sheet (28) of polyimide for use between the first sheet and the spacecraft that is substantially dielectric. The fabric of the dielectric sheet is not carbon loaded and is also available for example from DuPont under the trademark KAPTON. The second sheet is in contact with the internal side of the first sheet and has its own internal side (28b) for facing the spacecraft. The dielectric sheet (28) is preferably from 0.0005 to 0.001 inches (0.013 mm to 0.026 mm) thick. The second dielectric sheet (28) provides an insulating barrier to electrostatic discharge and passive intermodulation between the first sheet (26) and the spacecraft.

Figure 4:
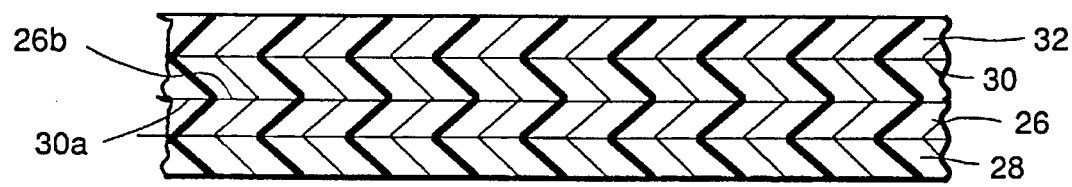
FIG. 4 shows a second alternate blanket constructed according to the present invention.

FIG. 4 shows a further enhanced blanket constructed according to the present invention which incorporates a third sheet (30) which is dielectric and a fourth sheet (32) which is carbon loaded. The third sheet (30) is substantially identical to the other dielectric sheet (28) and has an internal side (30a) which faces the external side of the first sheet (26). The fourth sheet faces the third sheet and its external side faces the space environment. All four sheets are substantially the same size so that they are coextensive. It is preferred however that the resistivity for the two carbon loaded sheets (26, 32) vary, one sheet having a relatively high resistivity preferably about 1,200 ohms per square and the other having a relatively low resistivity preferably about 200 ohms per square, the high resistivity sheet preferably being the outermost or external sheet relative to the spacecraft. The high resistivity outer sheet provides substantial electrostatic discharge protection and isolation and generates essentially no passive intermodulation of its own. It has been measured to provide approximately a 3 decibel reduction in radio frequency passthrough. The low resistivity sheet is provided primarily for radio frequency shielding purposes and has been measured to provide a 7 decibel radio frequency passthrough reduction. While it does generate a small amount of passive intermodulation, at the same time it shields other parts from passive intermodulation from other sources. In antenna applications, the sheet shields passive intermodulation sources from antenna transmit fields preventing still higher levels of passive intermodulation generation.

Figure 5:
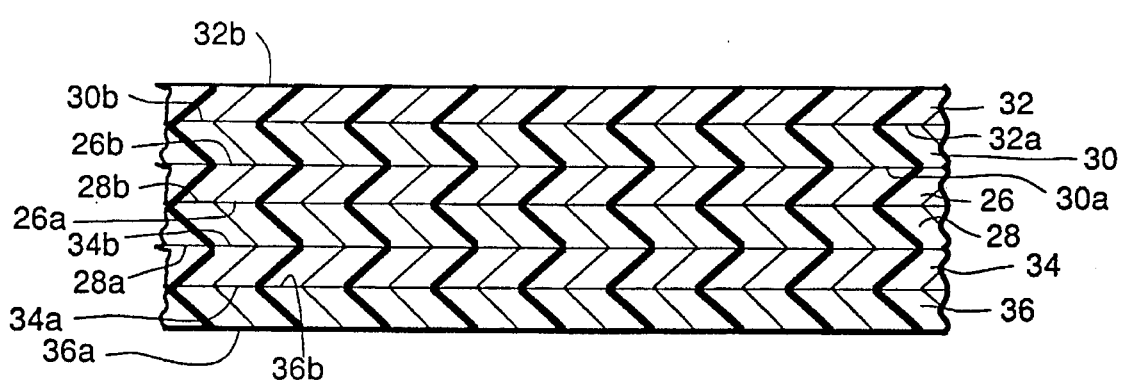
FIG. 5 shows a third alternate blanket constructed according to the present invention.

As shown in FIG. 5 the blanket can be enhanced still further by providing a fifth and sixth polyimide sheet. To enhance radio frequency interference shielding, the fifth sheet is a high resistivity carbon loaded KAPTON sheet (34) facing the internal side of the second sheet and the sixth sheet is an additional dielectric KAPTON sheet (36) facing the internal side of the fifth carbon loaded sheet. Such a blanket has three coextensive carbon loaded KAPTON sheets (26, 32, 34). The outer and inner sheets (32, 34) have a higher resistivity, preferably about 1200 ohms per square, and the middle sheet (26) has a relatively lower resistivity, preferably about 200 ohms per square. The sheets are separated by substantially identical coextensive dielectric KAPTON sheets (28, 30, 36) placed in between the carbon loaded sheets for insulation purposes. In other words, each sheet of each embodiment has an external side for facing toward the space environment and an internal side for facing toward the spacecraft. These sides are placed adjacent to each other to form the blanket. As shown in FIG. 5, the internal side (36a) of the sixth sheet faces and may contact the spacecraft in use. The sixth sheet external side (36b) is adjacent the fifth sheet internal side (34a). The fifth sheet external side (34b) is adjacent to the second sheet internal side (28a). The second sheet external side (28b) is adjacent to the first sheet internal side (26a). The first sheet external side (26b) is adjacent the third sheet internal side (30a). The third sheet external side is adjacent the fourth sheet internal side and the fourth sheet external side is directly exposed to the space environment. Such a blanket using the sheets described above has been measured to provide a 12½ decibel reduction in radio frequency passthrough and a 40 decibel reduction in passive intermodulation in addition to its other thermal isolation and other characteristics. If desired, the outermost surface of any of the blankets in FIGS. 2–5 can be coated with a reflective coating, such as white paint as is well known in the art. The precise number and order of sheets may be varied further to suit different applications.

The blanket is preferably attached to the spacecraft conventionally using rivets. Grounding wires as are well known in the art are preferably used to ground all layers of the blanket to the spacecraft body. The layers of the blanket are preferably stitched together using conventional thread as is known in the art.

Applicant first tested a blanket embodying the present invention in a spacecraft launched Oct. 30, 1990. The spacecraft first entered a true space environment sometime after the launch date. It was in this space environment that the blanket's true effectiveness could first be accurately measured.

While the blanket has been described only in a few different embodiments it will be apparent to those skilled in the art that a wide variety of modifications and adaptations may be made. The blanket may be applied to a great variety of different spacecraft to shield different types of spacecraft componentry including but not limited to antennas and electronics. The blanket provides protection for spacecraft not only in earth orbit but also on deep space missions. The invention is not to be limited to the embodiments described above but only by the claims which follow.

What is claimed is:

1. A blanket for protecting a spacecraft form a space environment comprising a carbon loaded plastic sheet wherein the sheet has an external side for facing the space environment and an internal side for facing the spacecraft, and further comprising a second dielectric plastic sheet substantially coextensive with the first sheet adjacent to the internal side of the first sheet.

2. The blanket of claim 1 comprising a third dielectric plastic sheet and a fourth carbon loaded plastic sheet, the third and fourth sheets being adjacent to each other and each substantially coextensive with the first sheet, the fourth sheet having an external side opposite the third sheet for facing the space environment and the third sheet having an internal side opposite the fourth sheet adjacent to and facing the first sheet external side.

3. The blanket of claim 2 wherein the first sheet has a resistivity between 50 and 350 ohms per square and the fourth sheet has a resistivity greater than 800 ohms per square.

4. The blanket of claim 2 wherein the plastic of each sheet comprises a flexible polyimide.

5. The blanket of claim 2 comprising a fifth dielectric plastic sheet and a sixth carbon loaded plastic sheet, the fifth and sixth sheets being adjacent to each other and each substantially coextensive with the first sheet, the sixth sheet having an external side opposite the fifth sheet for facing the space environment and the fifth sheet having an internal side opposite the sixth sheet adjacent to and facing the fourth sheet external side.

6. The blanket of claim 5 wherein the fourth sheet has a resistivity of between 50 and 350 ohms per square and the first and sixth sheets have a resistivity of greater than 800 ohms per square.

7. The blanket of claim 5 wherein the plastic of each sheet consists essentially of a flexible polyimide.

8. The blanket of claim 5 further comprising an electromagnetic radiation reflective layer on the external side of the sixth sheet.

9. The blanket of claim 5 wherein each sheet is held adjacent the respective adjacent sheets by thread stitched through the respective sheets.

10. A method for reducing passive intermodulation about a spacecraft exterior in a space environment comprising attaching a blanket including a carbon loaded plastic sheet to at least a portion of the spacecraft exterior, the plastic sheet having a resistivity of between 100 and 10,000 ohms per square.

11. A method for protecting a spacecraft from passive intermodulation in a space environment comprising attaching a blanket including a carbon loaded plastic sheet having a resistivity of between 10 and 10,000 ohms per square, and a dielectric plastic sheet to at least a portion of the spacecraft exterior.

12. The method of claim 10 wherein the step of attaching a blanket comprises attaching a blanket wherein the sheet is formed substantially of a flexible carbon loaded polyimide.

13. The method of claim 12 wherein the step of attaching a blanket comprises attaching a blanket wherein the polyimide sheet comprises KAPTON.

14. The method of claim 12 wherein the step of attaching a blanket comprises attaching a blanket wherein the sheet has a resistivity of between 100 and 350 ohms per square.

15. A method for reducing passive intermodulation about a spacecraft exterior in a space environment comprising attaching a blanket including a carbon loaded plastic sheet having a resistivity of between 100 and 10,000 ohms per square between an electrically conductive structure on at least a portion of the spacecraft exterior and a source of electromagnetic radiation for isolating the electrically conductive structure from the electromagnetic radiation.

16. The method of claim 15 wherein the step of attaching a blanket comprises attaching a blanket wherein the sheet is formed substantially of a flexible carbon loaded polyimide.

17. The method of claim 16 wherein the step of attaching a blanket comprises attaching a blanket wherein the polyimide sheet comprises KAPTON.

18. The method of claim 15 wherein the step of attaching a blanket comprises attaching a blanket wherein the sheet has a resistivity of between 100 and 350 ohms per square.

19. The method of claim 15 wherein the step of attaching a blanket comprises attaching a blanket wherein the sheet has a resistivity greater than 800 ohms per square.

* * * * *